Patented Aug. 26, 1952

2,608,588

UNITED STATES PATENT OFFICE 2,608,588

UNSATURATED CARBINOL AND PROCESS OF PREPARING SAME

Ian Morris Heilbron and Basil Charles Leicester Weedon, London, Ewart Ray Herbert Jones, Manchester, Benjamin Arthur Hems, Northolt, and Alexander Bertus Arnold Jansen, London, England, assignors to Glaxo Laboratories Limited, Greenford, England, a British company No Drawing. Application March 7, 1950, Serial No. 148,265. In Great Britain March 22, 1949

10 Claims. (Cl. 260—617)

This invention is concerned with improvements in or relating to the preparation of a new unsaturated carbinol, namely 3:7-dimethyl-1-(2':6':6'-trimethylcyclohex-1'-enyl)-nona-4:6:8-trien-1-yn-3-ol which may be represented by the following structural formula

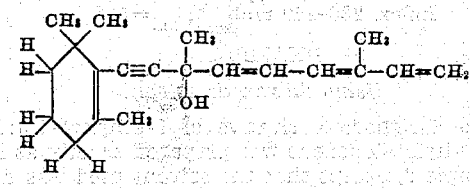

and which is of use in the synthesis of vitamin A.

We have found that the new carbinol can conveniently be prepared by reacting a halogeno magnesium derivative of 2:6:6:-trimethyl-1-ethynylcyclohexene with 6-methylocta-3:5:7-trien-2-one in the presence of an inert solvent as herein defined and subsequently decomposing the resulting complex formed; this reaction may be represented as follows:

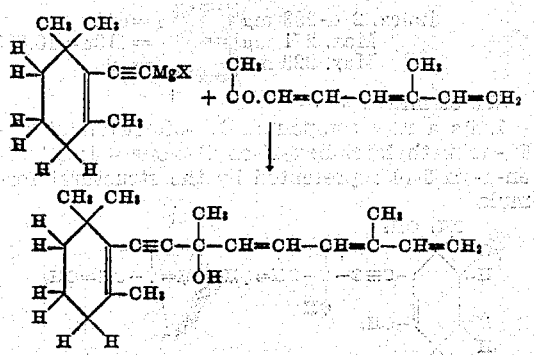

where X is chlorine or bromine.

Accordingly the invention comprises the new compound, 3:7-dimethyl-(2':6':6'-trimethylcyclohex-1'-enyl)-nona-4:6:8-trien-1-yn-3-ol represented by the structural formula

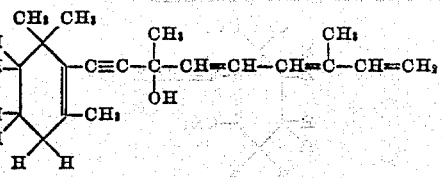

According to a further feature of the invention we provide a process for the preparation of 3:7-dimethyl-1-(2':6':6'-trimethylcyclohex-1'-enyl)- nona-4:6:8-trien-1-yn-3-ol in which a halogeno magnesium derivative of the general formula

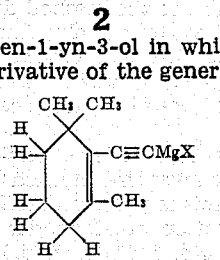

where X has the above stated meaning is reacted with 6-methylocta-3:5:7-trien-2-one in the presence of an inert solvent as herein defined and the resulting organo-magnesium complex decomposed to yield the desired carbinol.

The term "inert solvent" as used herein means an organic solvent which has no demonstratable action on the reactants or the products of the reaction, other than the normal action of solvents in Grignard reactions. At present we prefer to use aliphatic ethers or cyclic aliphatic ethers having from 4–10 carbon atoms, for example diethyl ether, dibutyl ether, tetrahydrofuran or dioxane; other inert solvents may if desired be used in conjunction with these solvents. It is also preferable that the solvent used should be as dry as possible.

The first stage of the process is preferably carried out at temperatures within the range of from $-30°$ to $+20°$ C., preferably in an inert atmosphere for example in an atmosphere of nitrogen. It is generally desirable to have present a small quantity of an anti-oxidant such as hydroquinone.

The second stage of the process, namely the decomposition of the organo magnesium complex may be carried out by conventional methods for example by the use of water which may contain other reagents. The use of strongly acidic reagents in the decomposition should preferably be avoided as such reagents may cause rearrangement of the carbinol. At present we prefer to use an aqueous solution of ammonium chloride for the decomposition which may be effected at low temperatures, for example $0°$ C.

The halogeno magnesium derivative of 2:6:6-trimethyl-1-ethynylcyclohexene may be prepared by conventional methods; we prefer, according to a further feature of the invention to prepare this derivative by treatment of 2:6:6-trimethyl-1-ethynycyclohexene with an alkyl Grignard reagent AlkMgX (where X has the above stated meaning) such as ethyl magnesium bromide. This reaction is preferably effected at elevated temperatures, and temperatures within the range 20–80° C. have, for example, been found to be satisfactory. This reaction is also preferably effected in an inert atmosphere and in the same solvent as is used for the first stage of the process according to the invention. We have found that the stated new compound, is the purest form we have been able to obtain, has the following characteristics:

Refractive index $n_D^{15°} = 1.5630$
Light absorption, max:
271 and 281 m$\mu$; inflex. 235–245.
$E_{1\,cm.}^{1\%}$, 1475, 1253 and 625 respectively.
$\epsilon$, 43700, 37400, and 18500 respectively.

It will be understood that these characteristics were determined on the purest material we have been able to obtain and may be subject to variation dependent on the purity of the product.

2:6:6-trimethyl-1-ethynylcyclohexene may be prepared by any convenient method but at present we prefer to use the method described in the copending application of John Harold Chapman, Serial No. 143,342, filed February 9, 1950, now Patent No. 2,584,969. An alternative method of preparation is described in specification No. 627,453.

6-methylocta-3:5:7-trien-2-one may be prepared by any convenient method but at present we prefer to use the process described in the copending application of Alexander Bertus Arnold Jansen, Serial No. 148,264, filed March 7, 1950. Another method of preparing this compound is described in the copending application of Ian M. Heilbron et al., Serial No. 148,261, filed March 7, 1950.

In order that the invention may be well understood the following examples are given only as illustrations:

EXAMPLE 1

2:6:6-trimethyl-1-ethynyl-cyclohex-1-ene (3 g.) in dry ether (15 c. c.) was added to a solution of ethyl magnesium bromide (from 0.6 g. magnesium) in ether (20 c. c.). The mixture was refluxed under nitrogen for two hours and was then cooled in an ice bath. 6-methylocta-3:5:7-trien-2-one (3 g.) in ether (15 c. c.) was then added dropwise with stirring. After two hours stirring at 0° C. the mixture was treated with excess of an ammonium chloride solution and the ethereal layer washed with water, dried and evaporated. The residual brown oil (5.8 g.) $n_D^{14} = 1.5600$, showed absorption maxima at 271 and 238 m$\mu$ $E_{1\,cm.}^{1\%}$ 1058 and 697 respectively, and an inflexion at 276–284 m$\mu$ ($E_{1\,cm.}^{1\%} = 870$).

Found on a portion distilled at 130° C./10⁻⁵ mm. C, 84.2%; H, 9.7% $C_{20}H_{28}O$ requires C, 84.5%; H, 9.9%.

EXAMPLE 2

Using tetrahydrofuran as solvent 1-ethynyl-2:6:6-trimethylcyclohexene (2.0 g.) in tetrahydrofuran (7.0 ml.) was added slowly at —20° C. to a solution of ethyl magnesium bromide (prepared from magnesium (0.32 g.), ethyl bromide (2.5 g.) in tetrahydrofuran (15 ml.). This mixture was stirred overnight at room temperature in an atmosphere of nitrogen, then cooled to —30° C. and a solution of 6-methylocta-3:5:7-trien-2-one (1.8 g.) in tetrahydrofuran (10 ml.) added drop by drop. After stirring a further 2 hours at —30° C., the mixture was allowed to warm up to —10° C. and a solution of ammonium chloride (5.0 g.) in water (15 ml.) was added to decompose the complex. The mixture was extracted with ether and the extracts washed with water and dried over anhydrous magnesium sulphate. Evaporation of the solvent under vacuum gave 3:7-dimethyl-1-(2':6':6'- trimethylcyclohex - 1'- en-1'-yl)nona-4:6:8-trien-1-yn-3-ol (2.9 g.) as a viscous oil $n_D^{15} = 1.5800$.

U. V. absorption:

Inflex. 274–284 m$\mu$ $E_{1\,cm.}^{1\%}$ =937
Max. 271 m$\mu$ =986 $\epsilon$ = 28,000
Inflex. 238 m$\mu$ =530

EXAMPLE 3

Using di-n-butyl ether as solvent

The reaction was carried out exactly as in Example 2 except that di-n-butyl ether was used as the solvent in the reaction. 3:7-dimethyl-1-(2':6':6'-trimethylcyclohex - 1'- en - 1'-yl)nona-4:6:8-trien-1-yn-3-ol (3.0 g.) was obtained as a viscous oil. $n_D^{15} = 1.5545$.

U. V. absorption:

Max. 282 m$\mu$ $E_{1\,cm.}^{1\%}$ = 965 $\epsilon$ = 26,400
Max. 271 m$\mu$ =1144 $\epsilon$ = 32,800
Inflex. 230–249 m$\mu$ =566

EXAMPLE 4

Using dioxan as solvent

The Grignard derivative of 1-ethynyl-2:6:6-trimethylcyclohexene was prepared exactly as in Example 2, except that the solvent used was diethyl ether. 6-methylocta-3:5:7-trien-2-one (2.0 g.) in dioxan (10 ml.) was then added slowly at room temperature and the mixture stirred for a further 2 hours. Decomposition of the complex with ammonium chloride and working up as before gave 3:7-dimethyl-1-(2':6':6'-trimethyl-cyclohex-1'-en-1'-yl)-nona-4:6:8-trien-1-yn-3-ol (1.5 g.) as a viscous oil $n_D^{15} = 1.5475$.

U. V. absorption:

Inflex. 274–283 m$\mu$ $E_{1\,cm.}^{1\%}$ =412
Max. 271 m$\mu$ =413 $\epsilon$ = 10,800
Max. 229 m$\mu$ =700

We claim:

1. As a new compound, 3:7-dimethyl-(2':6':6' - trimethylcyclohex-1'-enyl) -nona - 4:6:8-trien-1-yn-3-ol represented by the structural formula

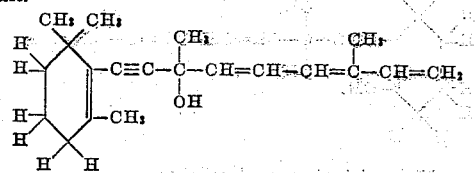

2. A process for the preparation of the carbinol 3:7-dimethyl - 1 - (2':6':6'-trimethylcyclohex-1'-enyl) -nona-4:6:8-trien-1-yn-3-ol, which comprises, reacting a halogeno magnesium derivative of the general formula

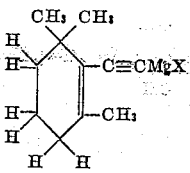

where X is a member of the group consisting of chlorine and bromine, with 6-methylocta-3:5:7-trien-2-one in the presence of an inert organic solvent and at a temperature within the range of −30° to +20° C. and decomposing the resulting organo magnesium complex to yield said carbinol.

3. A process as claimed in claim 2 in which the inert solvent is an ether selected from the group consisting of aliphatic and cyclic aliphatic ethers having from 4 to 10 carbon atoms.

4. A process as claimed in claim 2 in which the first stage of the process is carried out at a temperature within the range of −30° to +20° C. in an inert atmosphere, and in the presence of an anti-oxidant.

5. A process as claimed in claim 2 in which the organo magnesium complex is decomposed with an aqueous solution of ammonium chloride at a low temperature of the order of 0° C.

6. The process as claimed in claim 2, in which said solvent is di-ethyl ether.

7. The process as claimed in claim 2, in which said solvent is di-n-butyl ether.

8. The process as claimed in claim 2, in which said solvent is tetrahydrofuran.

9. The process as claimed in claim 2, in which said solvent is dioxane.

10. A process for the preparation of the carbinol 3:7-dimethyl-(2':6':6'-trimethylcyclohex-1'-enyl)-nona-4:6:8-trien-1-yn-3-ol which comprises reacting ethyl magnesium bromide with 2:6:6-trimethyl-1-ethynylcyclohexene in the presence of an inert solvent, reacting the product of said reaction with 6-methylocta-3:5:7-trien-2-one in the same solvent and at a temperature within the range of −30 to +20° C. and decomposing the resulting complex to yield said carbinol.

IAN MORRIS HEILBRON.
BASIL CHARLES LEICESTER WEEDON.
EWART RAY HERBERT JONES.
BENJAMIN ARTHUR HEMS.
ALEXANDER BERTUS ARNOLD JANSEN.

REFERENCES CITED

The following references are of record in the file of this patent:

Gilman, Organic Chemistry, an Advanced Treatise (1943), p. 496, J. Wiley and Sons, New York.

Tome, Thesis for BS degree at Mass. Inst. of Tech., May 23, 1947, pp. 6, 14 and 15.

Milas, The Synthesis of Vitamin A (1947), p. 24 (a reprint from Vitamins and Hormones, vol. V, 1947), (New York).

Cheeseman, Heilbron, Jones, Sondheimer and Weedon, Journal of the Chemical Society, 2031-35, August 1949 (London).